(12) United States Patent
Sawada (10) Patent No.: US 7,275,759 B2
(45) Date of Patent: Oct. 2, 2007

(54) COVER FOR USE IN AIRBAG APPARATUS, AND AIRBAG APPARATUS

(75) Inventor: Masami Sawada, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/360,677

(22) Filed: Feb. 24, 2006

(65) Prior Publication Data

US 2006/0202447 A1   Sep. 14, 2006

(30) Foreign Application Priority Data

| Mar. 8, 2005 | (JP) | ............................ 2005-064086 |
| Jul. 20, 2005 | (JP) | ............................ 2005-210221 |
| Oct. 21, 2005 | (JP) | ............................ 2005-307340 |

(51) Int. Cl.
*B60R 21/20* (2006.01)

(52) U.S. Cl. ............................... 280/728.3; 280/728.1; 280/732

(58) Field of Classification Search ............ 280/728.3, 280/732, 728.1, 728.2
See application file for complete search history.

(56) References Cited

U.S. PATENT DOCUMENTS

| 6,296,270 | B1 * | 10/2001 | Amamori ................. 280/728.2 |
| 6,338,499 | B2 | 1/2002 | Ueno et al. |
| 6,394,485 | B1 * | 5/2002 | Amamori ................. 280/728.2 |
| 6,601,870 | B2 * | 8/2003 | Suzuki et al. ............ 280/728.3 |
| 6,672,611 | B2 * | 1/2004 | Preisler et al. .......... 280/728.3 |
| 6,742,804 | B2 * | 6/2004 | Suzuki et al. ............ 280/728.3 |
| 6,860,505 | B2 * | 3/2005 | Yasuda et al. ........... 280/728.3 |
| 6,929,280 | B2 * | 8/2005 | Yasuda et al. ........... 280/728.2 |
| 7,080,852 | B2 * | 7/2006 | Hayashi .................. 280/728.3 |
| 2002/0117834 | A1 | 8/2002 | Hier et al. |
| 2004/0041379 | A1 * | 3/2004 | Hayashi ...................... 280/732 |
| 2004/0070181 | A1 * | 4/2004 | Hayashi et al. ......... 280/728.3 |
| 2004/0075251 | A1 * | 4/2004 | Fujii et al. .............. 280/728.3 |
| 2004/0113398 | A1 * | 6/2004 | Kanno et al. ............ 280/728.3 |
| 2005/0140121 | A1 * | 6/2005 | Hayashi et al. ......... 280/728.3 |
| 2006/0103117 | A1 * | 5/2006 | Hayashi .................. 280/728.3 |

FOREIGN PATENT DOCUMENTS

| DE | 19940984 | 3/2001 |
| JP | 2002-193061 | 7/2002 |
| JP | 2003-137054 | 5/2003 |
| JP | 2005-138674 | 6/2005 |

* cited by examiner

*Primary Examiner*—Paul N. Dickson
*Assistant Examiner*—Timothy D. Wilhelm
(74) *Attorney, Agent, or Firm*—Manabu Kanesaka (57) ABSTRACT

An airbag apparatus cover has a module cover with a module cover main body, and a door frame with a door frame movable member and a door frame fixed member. When an inflator discharges gas, the door frame movable member is moved upward by an expanding airbag. The module cover is broken along a tear line, and a door portion is cut off and separated from the surrounding module cover. The door portion is moved farther upward with the door frame movable member, and a tear line of the door portion is burst as it is pressed by the airbag. The door portion and its lining plate portions open like a door, and the airbag is expanded into a vehicle cabin. The fixed member, the movable member, and the module cover are integrally formed by a double-shot molding process, which facilitates the manufacture of the cover with high dimensional accuracy.

8 Claims, 7 Drawing Sheets

Prior Art

FIG. 6

Prior Art

COVER FOR USE IN AIRBAG APPARATUS, AND AIRBAG APPARATUS

BACKGROUND OF THE INVENTION AND RELATED ART STATEMENT

The present invention relates to an airbag apparatus mounted on a passenger seat of a motor vehicle, or the like. More particularly, the present invention relates to an airbag apparatus in which a door opens while being lifted into a vehicle cabin when the airbag is expanded. The present invention further relates to a cover for use in the airbag apparatus.

An airbag apparatus for a passenger seat mounted on a motor vehicle is provided with a folded airbag, a retainer to which the airbag is attached, an inflator (a gas generator) for expanding the airbag, a module cover or a module cover door portion to be disposed in front of the retainer, and the like.

When the inflator generates the gas, the airbag starts expanding operation, and the module cover or the module cover door portion is pushed open along a tear line so as to burst open. The airbag is then developed in a vehicle cabin to protect an occupant.

An airbag apparatus is disclosed in Japanese Unexamined Patent Application Publication No. 2003-137054, in which an airbag is configured such that, when the airbag is expanded, a door portion of a module cover is opened while being lifted toward a vehicle cabin so that the door portion of the module cover is smoothly opened.

Figure 4:
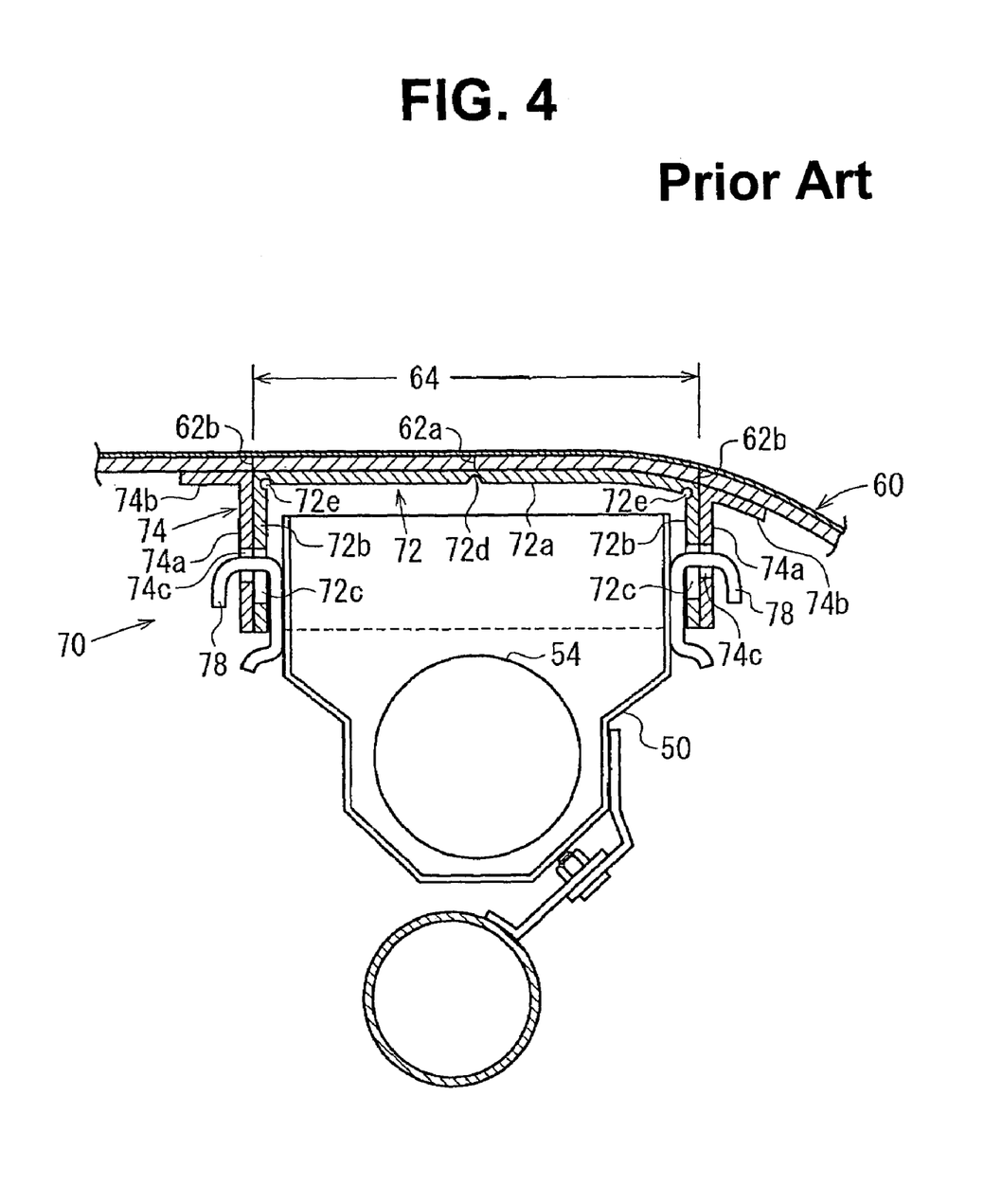
FIG. 4 is a cross-sectional view illustrating a conventional airbag apparatus.
Figure 5:
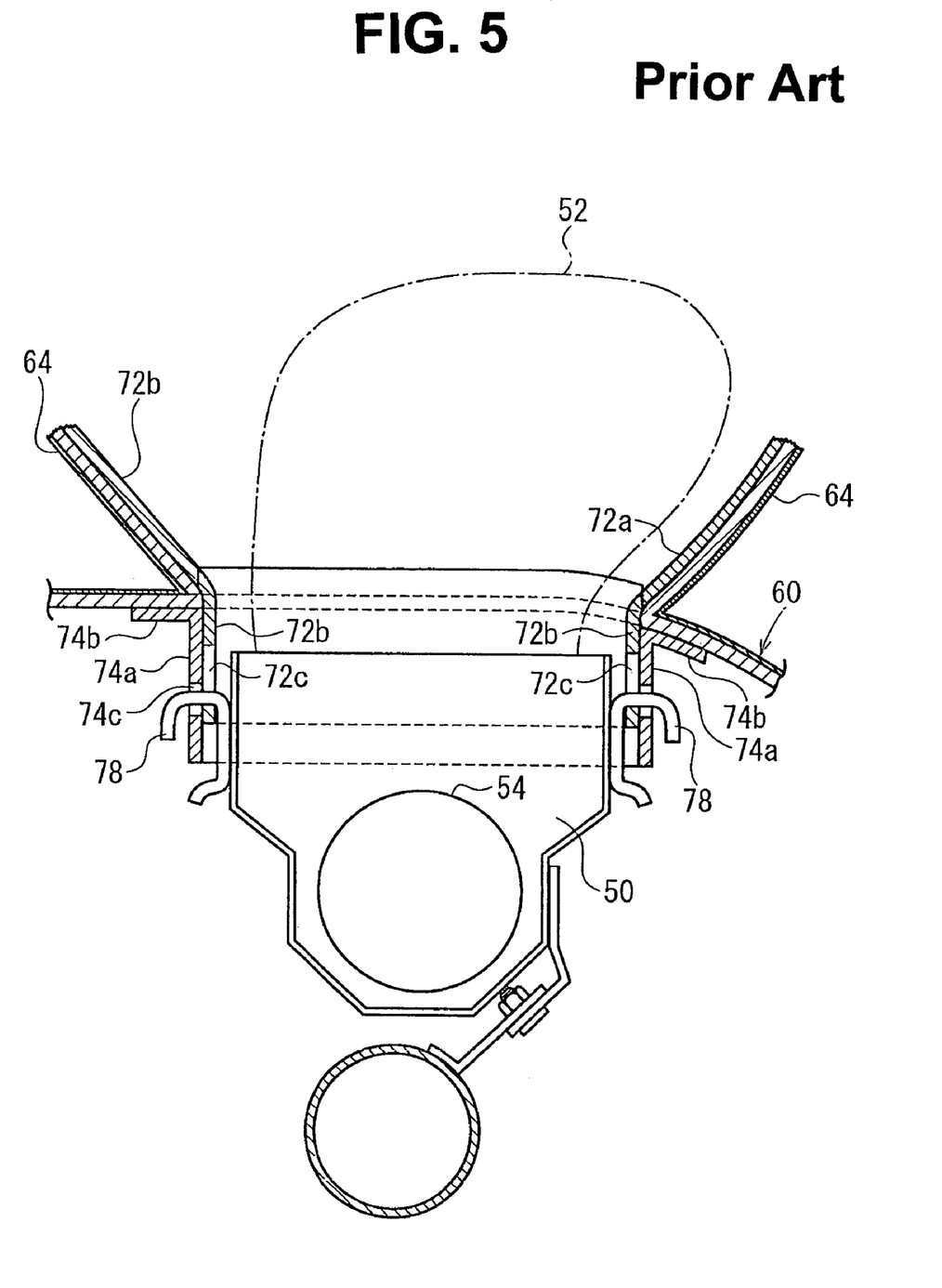
FIG. 5 is a cross-sectional view of the airbag apparatus depicted in FIG. 4 in operation.
Figure 6:
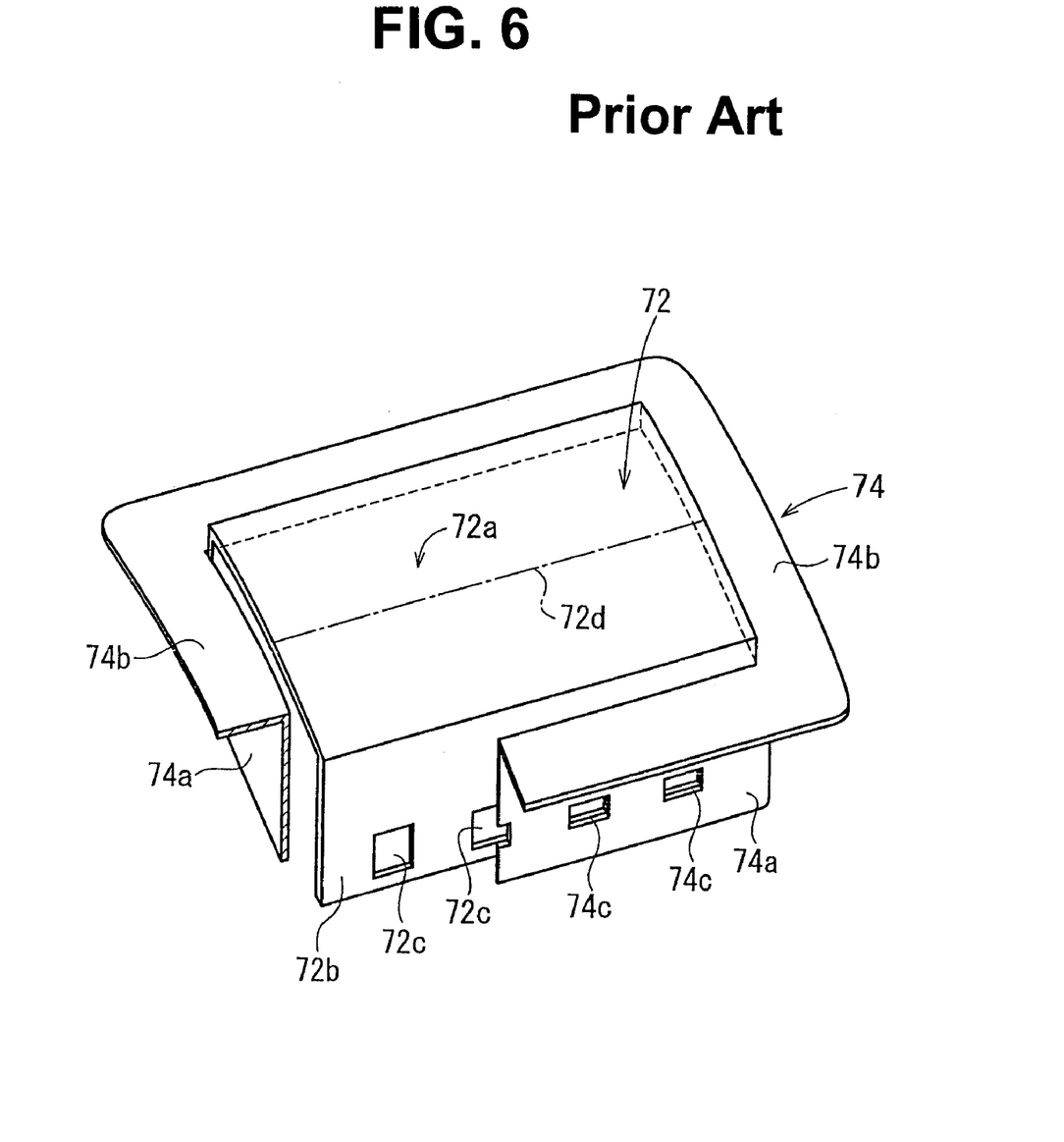
FIG. 6 is a perspective view illustrating the door frame of the airbag apparatus depicted in FIG. 4.

FIG. 4 is a cross-sectional view illustrating the airbag apparatus disclosed in Japanese Unexamined Patent Application Publication No. 2003-137054. FIG. 5 is a cross-sectional view illustrating the airbag apparatus in operation. FIG. 6 is a perspective view illustrating a door frame of the airbag apparatus.

As illustrated in FIG. 4, an airbag 52 being folded, (in FIG. 5) is housed in a retainer 50, which has a shape of an open-top container and is configured to be capable of being expanded by an inflator 54.

A portion above the retainer 50 is covered with a module cover (instrument panel) 60. Concave ridge-shaped tear lines 62a, 62b are formed in a module cover 60. A tear line 62b is formed to extend around along an upper edge of the retainer 50, and an inside area surrounded by the tear line 62b serves as a door portion 64. The tear line 62a extends so as to longitudinally traverse through a center of the door portion 64.

A door frame 70 formed of a door frame movable member 72 and a door frame fixed member 74 is provided at a rear face of the module cover 60. The door frame fixed member 74 has a rectangular frame shape and the door frame movable member 72 is slidably fit into inside thereof.

The door frame movable member 72 is provided with a lining plate portion 72a overlapping with the door portion 64 of the module cover 60 and a leg piece 72b that serves as a leg portion extending downward from both sides of the lining plate portion 72a as shown in FIG. 4, and a hooking hole 72c is formed in the leg piece 72b. A tear line 72d is formed in the lining plate portion 72a in a position overlapping with the tear line 62a. A hinge groove 72e formed of a concave ridge is provided along an intersecting corner portion of the lining plate portion 72a with the leg piece 72b.

The lining plate portion 72a is fixed to a rear face of the door portion 64 of the module cover 60 by means of vibration welding.

The door frame fixed member 74 is provided with a leg frame 74a serving as a rectangular frame-shaped leg portion extending around an outer periphery of the retainer 50, and a flange portion 74b extending outward from an upper end of the leg frame 74a. The flange portion 74b is fixed to a peripheral portion of the door portion 64 in the module cover 60 by means of vibration welding. A hooking hole 74c is formed in the leg frame 74a.

A hook 78 fixed to the retainer 50 is inserted into the hooking holes 72c, 74c.

When the inflator 54 is operated to discharge gas, the door frame movable member 72 is moved upward (lifted) by being pressed upward by the expanding airbag 52, as shown in FIG. 5. The module cover 60 is burst along the tear line 62b and the door portion 64 is cut off from the surrounding module cover 60. The door portion 64 is further moved upward with the door frame movable member 72, and the tear line 72d of the lining plate portion 72a and the tear line 62a of the door portion 64 are burst by being pressed by the airbag 52. Further, the door portion 64 starts to open like a door being separated into two ways of the left and the right direction and the airbag 52 is expanded in a vehicle cabin as shown in FIG. 5.

Thus, the door portion 64 performs lifting operation and is separated from the surrounding module cover 60, and thereby, the door portion 64 smoothly starts to open without receiving reaction force against a deformation from the surrounding module cover 60.

In an airbag apparatus disclosed in Japanese Unexamined Patent Application Publication No. 2003-137054, illustrated in FIGS. 4 through 6, a door frame fixed member 74 and a door frame movable member 72 are respectively molded into bodies separated from a module cover 60 and are combined with the module cover 60 by means of an ultrasonic welding process (described in the aforementioned reference in paragraph number 0016).

Thus, when module cover 60, the door frame movable member 72, and the door frame fixed member 74 are separately molded, and are fixed by means of the ultrasonic welding, a large amount of effort is required to conduct the molding and welding work. Further, the desired degree of positioning accuracy may not be obtained in the door frame movable member 72 and the door frame fixed member 74.

It is therefore an object of the present invention to facilitate the manufacture of a cover of an airbag apparatus, and to improve the dimensional accuracy of the cover in which a door frame movable member and a door frame fixed member are provided at a rear face of an interior panel, and in which a door portion is opened while the door frame movable member is being lifted.

Further objects and advantages of the invention will be apparent from the following description of the invention and the associated drawings.

SUMMARY OF THE INVENTION

A cover for use in an airbag apparatus according to one embodiment of the invention includes an interior panel constituting part of an inner face of a vehicle cabin, a door portion configured to open inside the vehicle cabin like a door and formed in the interior panel, a door frame movable member comprising a lining plate portion fixed to a rear face of the door portion and a leg portion standing from a side edge of the lining plate portion, and a door frame fixed member comprising a flange portion fixed to a peripheral part of the door portion in the interior panel and a leg portion standing from the flange portion.

The door frame movable member, the door frame fixed member, and the interior panel are integrally formed by means of a double-shot molding process.

In the cover, the leg portion of the door frame movable member and the leg portion of the door frame fixed member are arranged to face each other, and are serially connected together at each of base end sides thereof through a low strength portion to be burst when an airbag is expanded.

An airbag apparatus having the above-described cover includes a retainer arranged to face a rear side of the interior panel, an airbag housed in the retainer in a folded manner, and an inflator for expanding the airbag. The leg portion of the door frame movable member and the leg portion of the door frame fixed member are hooked with the retainer via a hooking member.

A cover for use in an airbag apparatus with respect to the present invention is integrally formed of an interior panel, a door frame movable member, and a door frame fixed member by means of a double molding process. Therefore, manufacturing of the cover is facilitated, and high dimensional accuracy of the cover is obtained.

Furthermore, in the airbag apparatus in the present invention, when the inflator is operated to discharge gas, the door frame movable member is also moved upward (lifted) by being pressed upward by an expanding airbag, and the door portion is cut off and separated from a surrounding interior panel. The door portion is further moved upward together with the door frame movable member and starts to open like a door, and the airbag is expanded into a vehicle cabin. Because the door portion is thus lifted and separated from the surrounding interior panel, the door portion starts to smoothly open without receiving reaction force against a deformation from the surrounding interior panel.

In the present invention, a low strength portion is provided between a base end side of a leg portion of the door frame movable member and that of a leg portion of the door frame fixed member. As a result, the door frame movable member is promptly cut off from the door frame fixed member when the door frame movable member is lifted.

BRIEF DESCRIPTION OF THE DRAWINGS

FIG. 1b is a partially enlarged view of FIG. 1a.

FIG. 7b is a partially enlarged view of a B-portion depicted in FIG. 7a.

DETAILED DESCRIPTION OF THE PREFERRED EMBODIMENTS

Figure 1A:
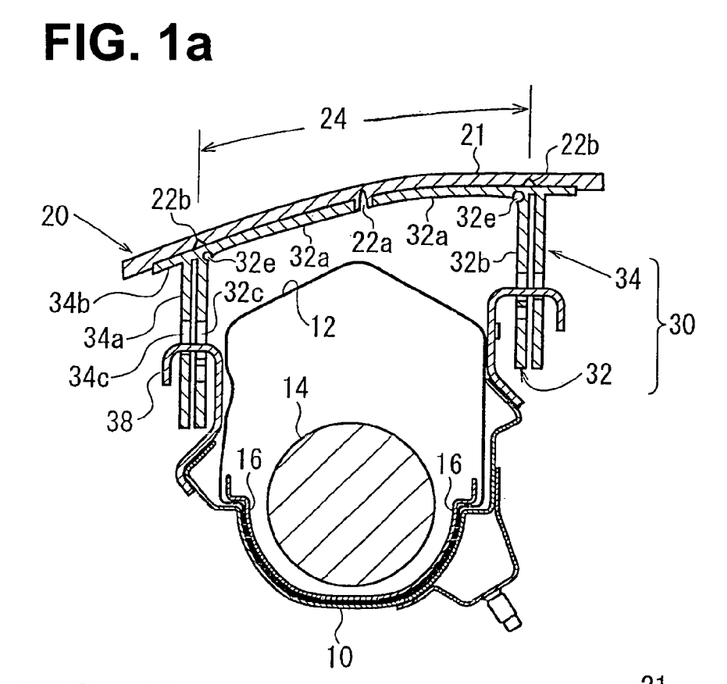
FIG. 1a is a cross-sectional view illustrating an airbag apparatus with respect to one embodiment of the present invention.
Figure 1B:
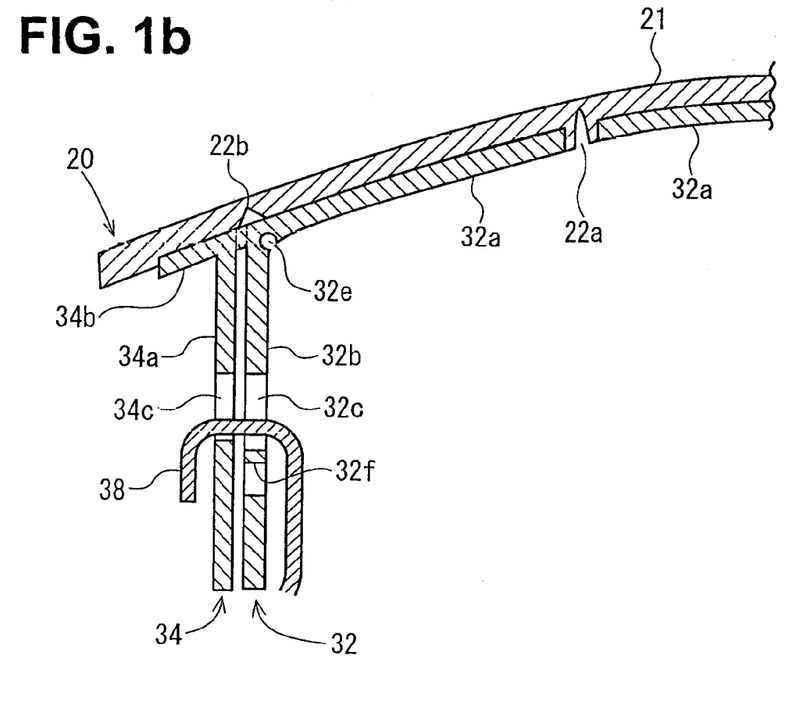

Hereinbelow, the embodiments of the present invention will be explained referring to the drawings. FIG. 1a shows a cross section of an airbag apparatus with respect to one embodiment of the present invention, and FIG. 1b is a partially enlarged view of FIG. 1a.

Figure 2:
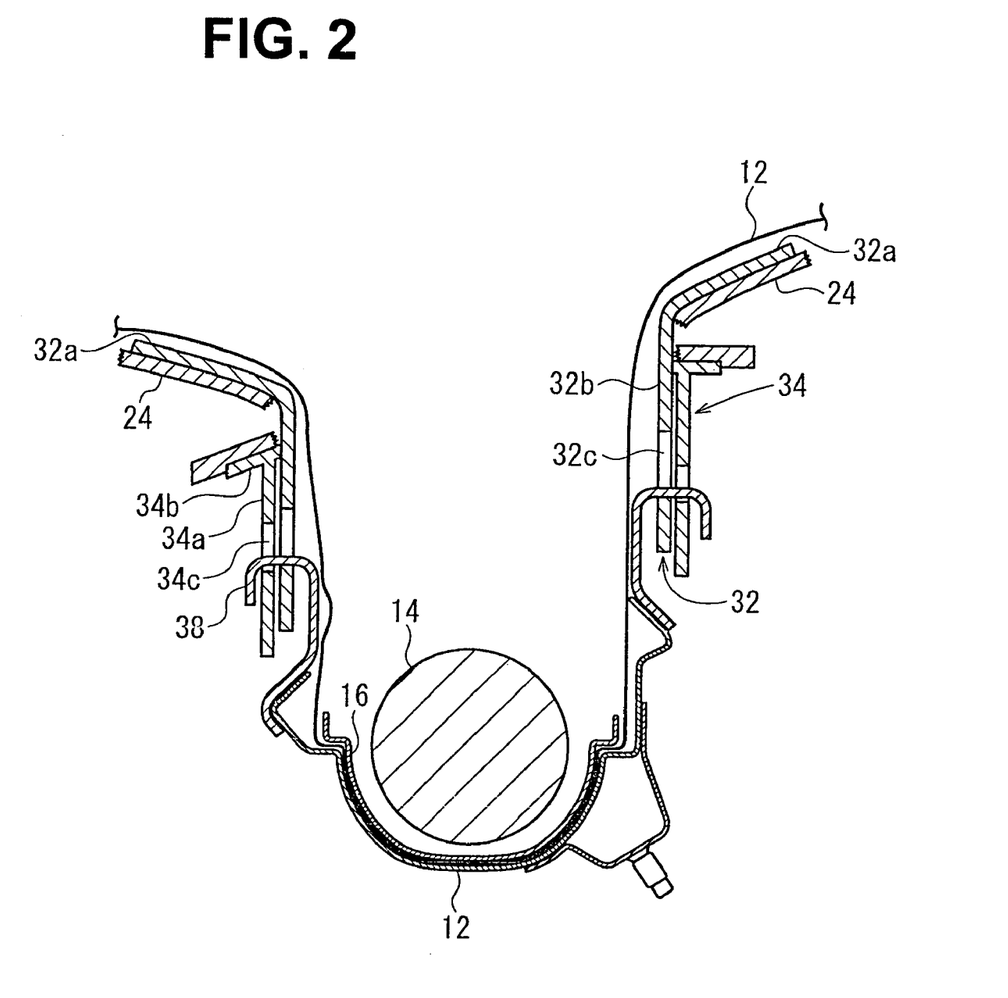
FIG. 2 is a cross-sectional view illustrating the airbag apparatus depicted in FIG. 1a in operation.
Figure 3A:
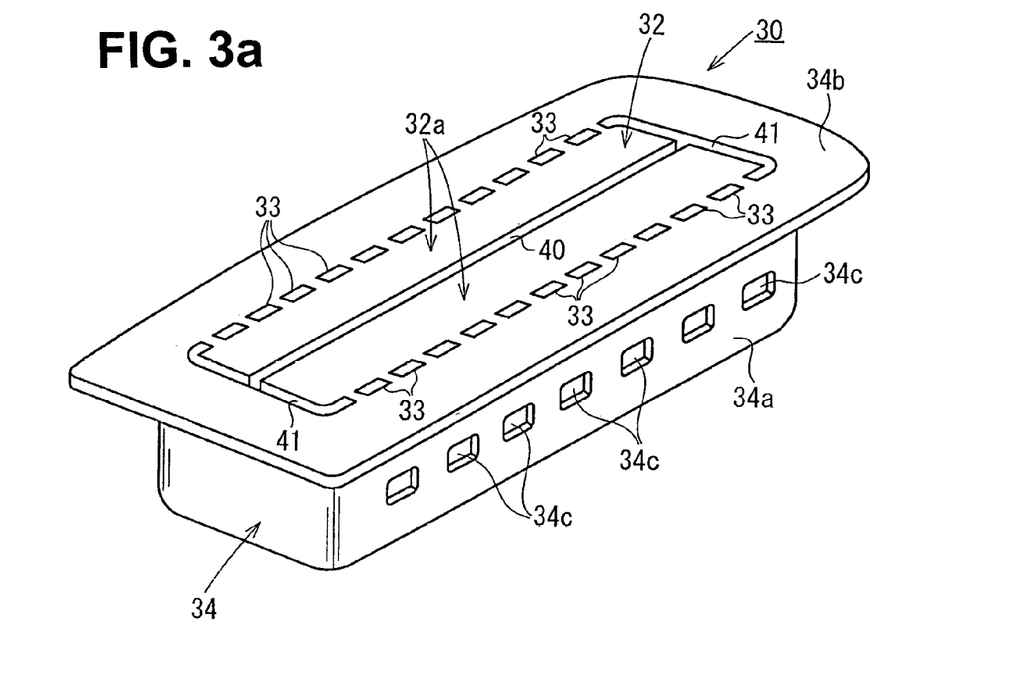
FIG. 3a is a perspective view illustrating a door frame of the airbag apparatus depicted in FIGS. 1a and 1b.
Figure 3B:
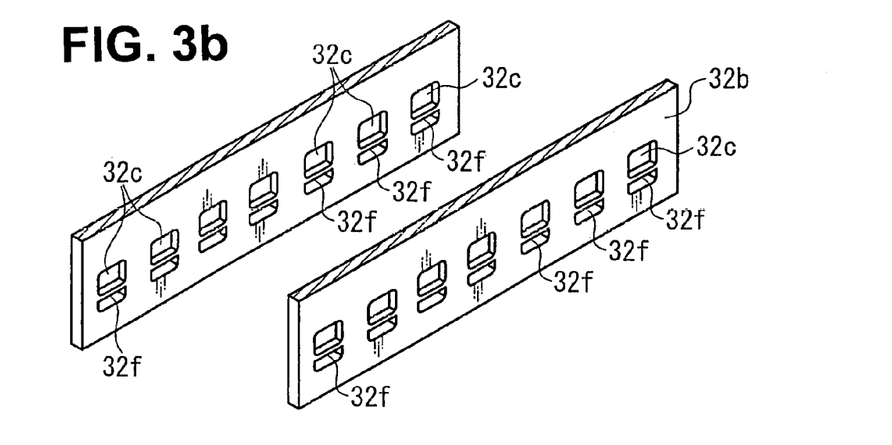
FIG. 3b is a perspective view illustrating a leg plate of a door frame movable member of the airbag apparatus depicted in FIGS. 1a and 1b.

FIG. 2 shows a cross section of the airbag apparatus of FIG. 1a in operation. FIG. 3a is a perspective view illustrating a door frame of the airbag apparatus of FIGS. 1a and 1b, and FIG. 3b is a perspective view illustrating a leg plate of a door frame movable member of the airbag apparatus of FIGS. 1a and 1b.

The airbag apparatus is an airbag apparatus for a passenger seat, which is mounted on a module cover. An airbag 12 of the airbag apparatus is folded and housed in a retainer 10 having a shape of an open-top container and is configured to be capable of being expanded by an inflator 14. The airbag 12 is attached to the retainer 10 by means of an attaching clamp 16.

A portion above the retainer 10 is covered with a module cover 20. Tear lines 22a, 22b formed of a ridge are provided in the module cover 20. The tear line 22b is disposed so as to extend around along an upper edge of the retainer 10, and an inside area surrounded by the tear line 22b serves as a door portion 24. The tear line 22a extends so as to longitudinally traverse through a center of the door portion 24.

The module cover 20 is formed of a module cover main body 21 and a door frame 30 including a door frame movable member 32 and a door frame fixed member 34. The door frame 30 is fixed to a rear face of the module cover main body 21. The door frame fixed member 34 has a rectangular frame shape and a pair of the L-shaped door frame movable members 32 is disposed inside thereof.

The door frame movable member 32 includes a leg plate 32b having an elongated rectangular shape serving as a leg portion and a lining plate portion 32a connected to an upper end of the leg plate 32b. The lining plate portion 32a is combined with a rear face of the door portion 24 of the module cover 20. A slit 40 (shown in FIG. 3) is formed between the lining plate portions 32a. A tear line 22a is formed at the rear face of the module cover main body 21 so as to overlap with the slit 40. As shown in FIG. 3, slits 41 are connected at both ends of the slit 40 so as to extend in a direction intersecting with the slit 40.

A hooking hole 32c is formed in the leg plate 32b. The hooking hole 32c has a shape that is elongated in a moving direction of the door frame movable member 32 (namely, in a direction perpendicular to the rear face of the module cover main body 21). In this embodiment a division bar portion 32f is provided in the hooking hole 32c in the middle of the moving direction of the door frame movable member 32. A hinge groove 32e formed of a concave ridge is provided along an intersecting corner portion of the lining plate portion 32a with the leg plate 32b.

The door frame fixed member 34 is provided with a leg frame 34a serving as a rectangular frame-shaped leg portion extending around an outer periphery of the retainer 10 and a flange portion 34b extending outward from an upper end of the leg frame 34a, and the flange portion 34b is combined with a peripheral portion of the door portion 24 in the module cover main body 21. A hooking hole 34c is formed in the leg frame 34a at a position overlapping with the hooking hole 32c.

A hook-shaped hook 38 fixed to the retainer 10 is inserted into the hooking holes 32c, 34c.

In this embodiment, the door frame movable member 32 and the door frame fixed member 34 that define the door frame 30 are integrally formed in a serial manner from the same material. The leg plate 32b of the door frame movable member 32 and the leg frame 34a of the door frame fixed member 34 are disposed to face each other across a slight clearance. Both of base end sides (upper end side in FIG. 1(a)) of the leg plate 32b and the leg frame 34a are connected together, however, slits 33 forming a perforated line is provided in line therebetween in predetermined intervals. The slits 33 serve as a low strength portion such that the door frame 30 can be cut when the door frame movable member 32 is lifted.

In this embodiment, the module cover 20 is integrally formed by means of a double-shot molding process. For example, in a mold formed of a core and a cavity, the door frame 30 is molded by means of injection molding process first. Then, after exchanging the cavity, the module cover main body 21 is formed by means of the injection molding process so as to be connected to the door frame 30. Thus, the double-shot molding process for forming the module cover 20 is completed.

In performing the injection molding process, in particular, when the module cover 20 is formed using an advanced cavity-core system mold for ultra low-pressure injection molding (ULPAC mold) having a heat-retention layer, a sink mark on a module cover surface is not formed, thereby-producing a module cover having a good appearance.

The operation of an airbag apparatus provided with the module cover 20 is as follows.

When the inflator 14 is operated to discharge the gas, as shown in FIG. 2, the door frame movable member 32 is moved upward (lifted) by being pressed upward by the expanding airbag 12. While the door frame movable member 32 is being lifted, the hook 38 is moved downward in the hooking hole 32c by a relative movement, as shown in FIG. 2, thereby deforming and bursting the division bar portion 32f. As a result, the door frame 30 is burst along the slits 33.

The module cover 20 is burst along the tear line 22b and the door portion 24 is cut off from the surrounding module cover 20. The door portion 24 is further moved upward with the door frame movable member 32 and the tear line 22a of the door portion 24 bursts resulting from being pressed by the airbag 12. The door portion 24 and each of the lining plate portions 32a start to open like a door, while being separated in two ways in the left and the right directions as shown in FIG. 2. Thus, the airbag 12 is expanded in the vehicle cabin.

Thus, because the door portion 24 is lifted and separated from the surrounding module cover 20, the door portion 24 starts to smoothly open without receiving reaction force against a deformation from the surrounding module cover 20.

The module cover 20 of the airbag apparatus is formed by integrally molding the door frame 30 which is defined by the door frame movable member 32 and the door frame fixed member 34 and the module cover main body 21 by means of a doubleshot molding process. Thus, the manufacturing of the module cover 20 is facilitated. In addition, because the door frame movable member 32 and the door frame fixed member 34 are integrally formed in a serial manner, positional and dimensional accuracy of each of the door frame movable member 32 and the door frame fixed member 34 is obtained.

Although the module cover 20 is described as an interior panel in the above-described embodiment, an instrument panel, or the like may be applicable.

Figure 7A:
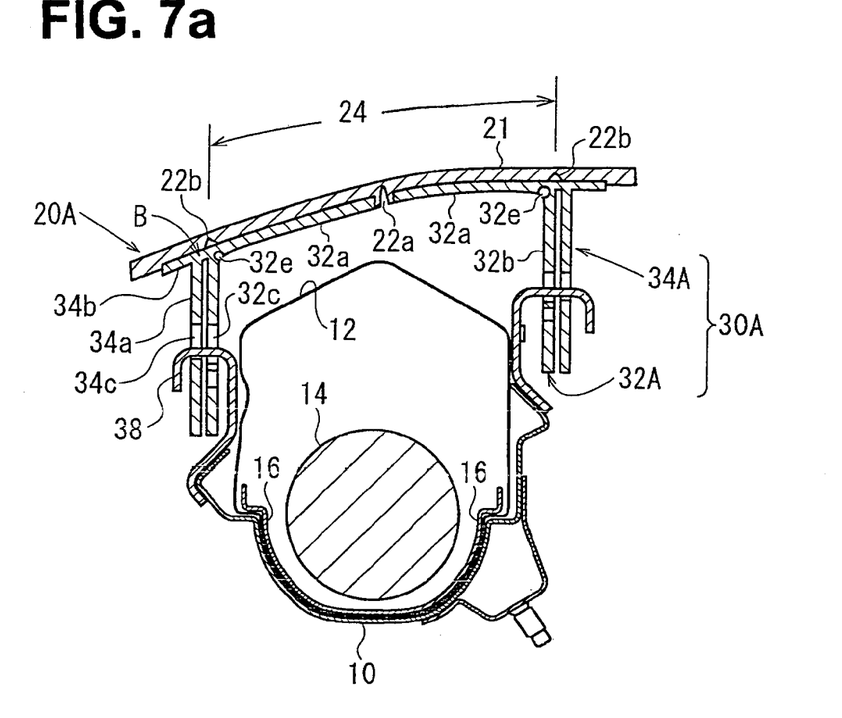
FIG. 7a shows a cross-section of a cover for use in the airbag apparatus with respect to another embodiment of the present invention.
Figure 7B:
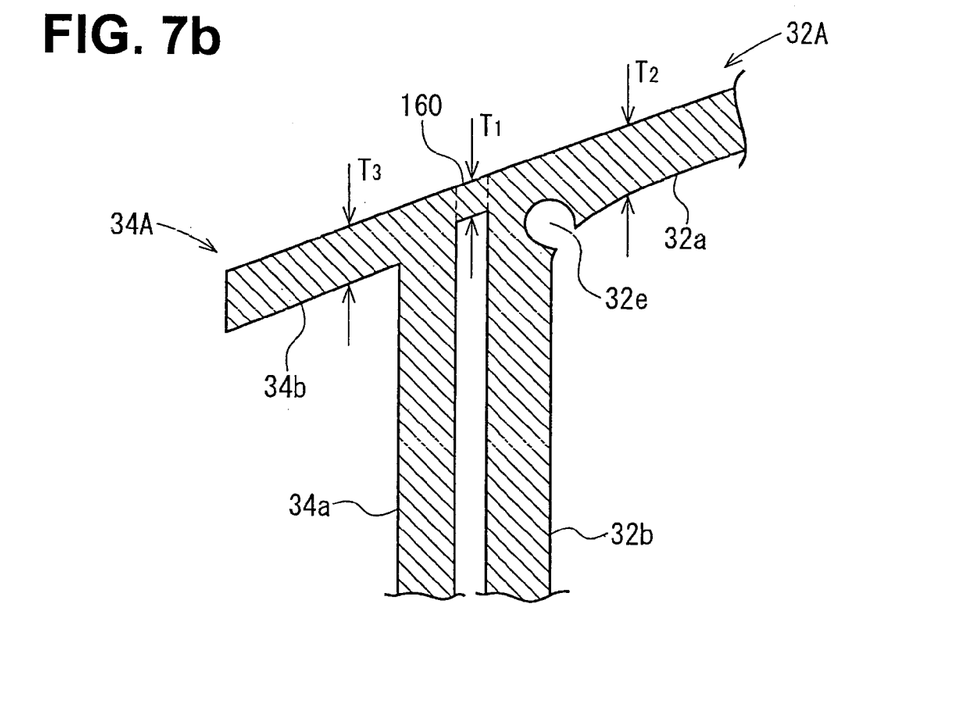

FIG. 7a shows a cross-section of a cover for use in the airbag apparatus with respect to another embodiment of the present invention, and FIG. 7b is a partially enlarged view of a B-portion depicted in FIG. 7a.

Similar to the module cover 20, in FIGS. 1a through 3b, described above, the module cover 20A of this embodiment is also provided with the module cover main body 21 and a door frame 30A including a door frame movable member 32A and a door frame fixed member 34A, both of which are fixed to a rear face of the module cover main body 21. Each of base end portions (upper end portion in FIG. 7a) of the leg plate 32b of the door frame movable member 32A and the leg frame 34a of the door frame fixed member 34A, which face each other, is connected by a connecting portion 160 (shown in FIG. 7b, though reference numbers are omitted in the embodiment, shown in FIGS. 1 through 3.). The door frame movable member 32A and the door frame fixed member 34A are integrally formed of the same material in a serial manner through the connecting portion 160.

In the embodiment in FIGS. 1 through 3, described above, the connecting portion 160 is configured to have a strength lower than that of the lining plate portion 32a of the door frame movable member 32 (more in detail, the hinge groove 32e at a base end side of the lining plate portion 32a) and the flange portion 34b of the door frame fixed member 34. However, in this embodiment, as shown in FIG. 7b, a wall thickness (thickness in the above and below directions in FIG. 7b) $T_1$ of the connecting portion 160 is set to be smaller than the thickness $T_2$ of the lining plate portion 32a (hinge groove 32e) and the thickness $T_3$ of the flange portion 34b. Thus, the connecting portion 160 is configured to have a strength lower than that of the lining plate portion 32a (hinge groove 32e) and the flange portion 34b.

In FIG. 7b, the illustration for the module cover main body 21 is omitted so as to clarify the construction of the vicinity of the connecting portion 160.

Furthermore, it is preferable to have the wall thickness $T_1$ of the connecting portion 160 be as small as possible. When the wall thickness $T_1$ is excessively small, however, there is a possibility that flow of a resin material from one side of the connecting portion 160 to the other side thereof is disturbed in a mold when molding a door frame. Therefore, the wall thickness $T_1$ is preferably set to be within a range from about 0.6 to about 1.5 mm.

In the cover for use in the airbag apparatus provided with the module cover 20A, when the inflator 14 is operated and the airbag 12 is thereby expanded, the lining plate portion 32a is pressed upward by means of the airbag 12. A door frame 30A is burst along the connecting portion 160 which has a strength lower than that of the lining plate portion 32a (hinge groove 32e) or that of the flange portion 34a. As a result, the door frame movable member 32A is separated from the door frame fixed member 34A and is lifted up.

As described in this embodiment, when the wall thickness $T_1$ of the connecting portion 160 is set smaller than the wall thickness $T_2$ of the lining plate portion 32a and the wall thickness $T_3$ of the flange portion 34a resulting in forming the connecting portion 160 to be a low strength portion, the connecting portion 160 is more smoothly broken.

Each of the above-described embodiments is illustrative of the present invention, but the present invention is not limited to each of the embodiments described herein.

For example, although each of the module covers 20, 20A is described as an interior panel in each of the above-described embodiments, an instrument panel, or the like, may be applicable.

The disclosures of Japanese Patent Application Nos. 2005-210221 filed on Jul. 20, 2005; 2005-064086 filed on Mar. 8, 2005; and 2005-30734 filed on Oct. 21, 2005, are incorporated herein.

What is claimed is:

1. A cover for an airbag apparatus, comprising:
an interior panel constituting part of an inner face of a vehicle cabin;
a door portion formed in the interior panel, the door portion capable of opening inside the vehicle cabin;
a door frame movable member comprising a lining plate portion fixed to a rear face of the door portion, and a first leg portion extending from a side edge of the lining plate portion; and
a door frame fixed member comprising a flange portion fixed to a peripheral part of the door portion in the interior panel, and a second leg portion extending from the flange portion,
wherein at least one of the door frame movable member and the door frame fixed member is integrally formed with the interior panel as a unit, and
wherein the first leg portion of the door frame movable member and the second leg portion of the door frame fixed member are arranged to face each other, and are serially connected together at each of base end sides thereof through a low strength portion configured to be broken as an airbag is expanded.

2. The cover according to claim 1, wherein said at least one of the door frame movable member and the door frame fixed member is a double-shot molded integrally formed unit with the interior panel.

3. The cover according to claim 1, wherein the low strength portion has a wall thickness smaller than a lining plate portion wall thickness and a flange portion wall thickness.

4. The cover according to claim 1, wherein the door frame movable member comprises a movable member hook opening that is elongated in a direction of motion of the door frame movable member, the movable member hook opening having disposed therein a bar portion capable of being broken by action of an expanding airbag, and
the door frame fixed member comprises a fixed member hook opening that overlaps with the movable member hook opening.

5. The cover according to claim 1, wherein the lining plate portion comprises opposed first and second opening portions, and a slit disposed between the first and second opening portions.

6. The cover according to claim 5, wherein the interior panel has a tear line overlapping with the slit disposed between the first and second opening portions.

7. The cover according to claim 5, wherein the first and second opening portions open during airbag expansion by opening in a direction away from each other.

8. An airbag apparatus comprising:
the cover according to claim 1,
a retainer arranged to face a rear side of the interior panel;
a hooking member attached to the retainer;
an airbag housed in the retainer in a folded manner; and
an inflator for expanding the airbag,
wherein the leg portion of the door frame movable member and the leg portion of the door frame fixed member are connected to the retainer by the hooking member.

* * * * *